Feb. 28, 1956 K. N. MOSELEY 2,736,353
METHOD OF MAKING A TOBACCO HOGSHEAD HEAD
Filed Jan. 2, 1953

INVENTOR
K. N. MOSELEY
BY A. Yates Dowell
ATTORNEYS

United States Patent Office 2,736,353
Patented Feb. 28, 1956

2,736,353

METHOD OF MAKING A TOBACCO HOGSHEAD HEAD

Kemper N. Moseley, Tifton, Ga.

Application January 2, 1953, Serial No. 329,341

1 Claim. (Cl. 144—309)

This application relates to hogsheads and more particularly to an improved hogshead head and the process by which it is made.

Heretofore heads for hogsheads have been customarily made by positioning boards of random width on a turntable and sawing them out to make an approximation of a circle. These loose or unconnected board members were customarily delivered to redrying plants for use in hogsheads as described later. Occasionally, one of the end or cant boards proved to be of very narrow width with the result that when the head was forced into a barrel such board would frequently break off.

Two principal methods have been employed for manufacturing hogsheads. In the first of these a head is formed first and then staves are placed around the head with it slightly below the top of the staves. The staves are then pressed into place. The barrel is then turned upside down, filled, and a head placed on top as will be described.

After the hogshead was filled with tobacco or other material, according to the prior practice, the crosspiece for the top head was laid in place on the tobacco and the unconnected head boards were then laid side by side on the crosspiece and nailed thereto. This was a difficult operation due to the tendency of the tobacco to yield while the boards were being nailed and frequently resulted in a poorly fastened assembly and a poorly fitting head.

According to a second method the barrel is formed first, using a ring member to hold the staves in proper relationship. The barrel is then stood on end and a head placed in its bottom. This is accomplished by having a man enter the upright barrel and place unconnected head boards in the bottom onto a liner which has been previously nailed in the barrel and a cross piece is then nailed onto the head boards.

The labor cost accompanying the previously used methods has been excessive. Also, the heads frequently have not been tight fitting nor as air tight or waterproof as desired. This is particularly undesirable for export shipment to countries in which tobacco is inspected and its moisture content determined and in which variations beyond a predetermined standard cause it to be downgraded or rejected entirely.

Accordingly, it is an object of the present invention to provide an improved hogshead head and process for making the same and which simplifies the process of fabricating complete hogsheads.

Figure 1:
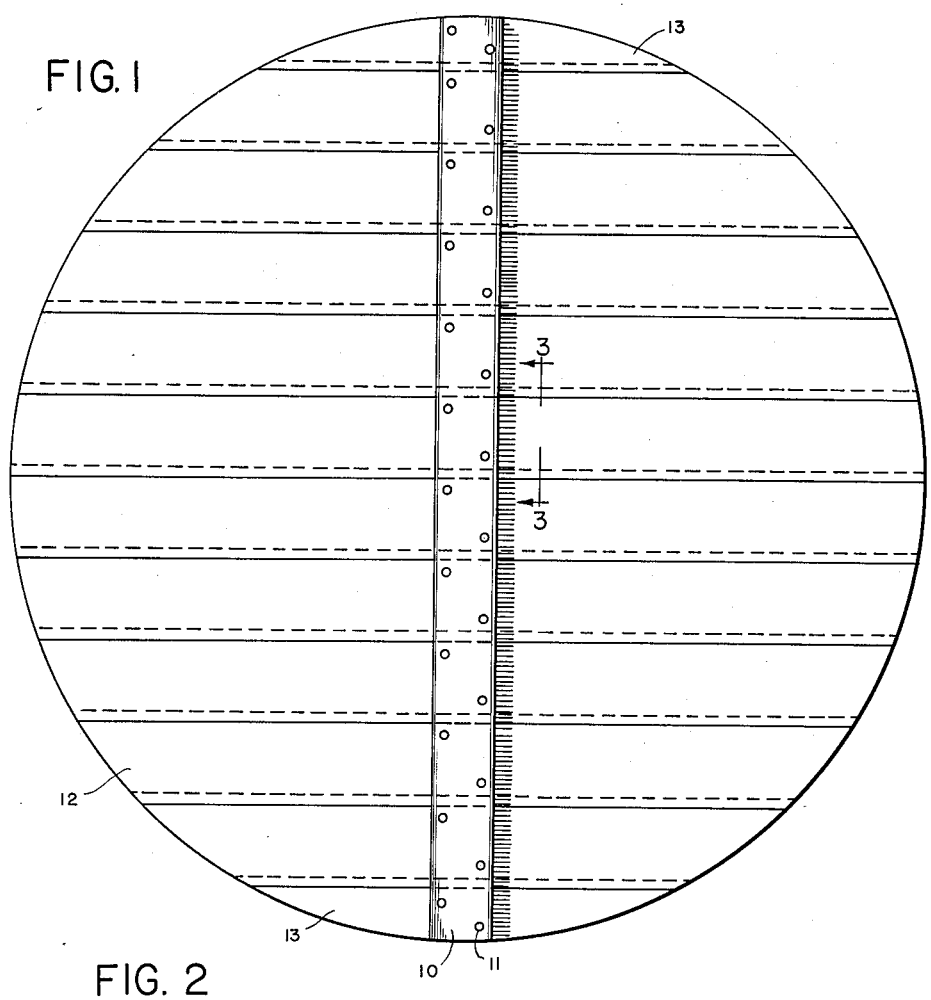
Figure 2:
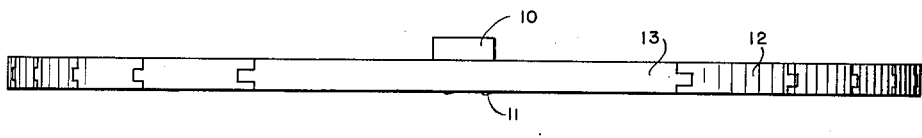

These and other objects of the invention will become apparent from the following description taken in conjunction with the drawings wherein:

Fig. 1 is a plan view of a hogshead head constructed in accordance with the present invention;

Fig. 2, a side elevation; and

Figure 3:
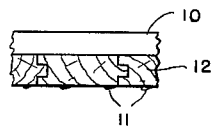

Fig. 3, a section on the line 3—3 of Fig. 1.

Briefly stated, an improved hogshead is constructed according to the present invention by employing lumber of uniform width which is prepared by cutting it into standard length pieces, processing it to provide interengaging edge portions such as tongue and groove, clamping a selected number having the necessary combined width in edgewise relation using substantial force, nailing a crosspiece of the proper length diametrically across the boards while the force is applied, and sawing out the head from the connected members and crosspiece while they are united under compression.

Referring to the details of fabrication and to the drawing, lumber is selected which is preferably thoroughly dried and which is dressed on one or both sides. For conventional heads a thickness of ¾" is used and the width varies from approximately 2" to 12", depending on the size of the heads that are to be formed, employing boards of uniform width for a head of given diameter and selecting the width so that the end or cant boards will not be of substantially less width than the remainder.

In processing, the lumber is first cut to the desired length, 46" or 47" being standard size for certain widely used hogsheads. The lumber is then machined on its edges in order to provide tongue and groove or similar type interengaging portions. A selected number of boards of selected width are then placed side by side on a flat surface and clamped together under substantial force, pressing the interengaged portions together. While the boards are still in the clamps under compression a crosspiece 10 is placed diametrically of the boards and nailed thereto by nails 11. In practice number six nails are used for each of the boards as indicated in the drawing. The nails pass completely through the crosspiece and the other boards and are preferably clenched on the opposite side.

The assembled unit is then removed from the clamps and cut into circular configuration to produce a head like that illustrated in the drawings. This can conveniently be done on a band saw having a turntable on which the connected boards are placed.

The resulting head as shown in the drawings is substantially circular; the intermediate boards 12 and the cant boards 13 are of a substantial width and preferably of substantially equal width. The crosspiece 10 extends entirely across the head so that no portion thereof such as the side of a cant board 13 is unsupported.

In the use of the improved board, applicant's prefabricated head may simply be dropped down into the end of the barrel and tapped into place against the liner. Similarly, after the barrel is filled the head is tapped into the top of the barrel, a liner nailed into place, and spikes driven into the hoop and staves into the head.

The tapping or forcing of the head into a hogshead forces the interengaging portions of the head into tighter engagement which further strengthens the head and increases its resistance to the passage of moisture. This sometimes eliminates the necessity for using waterproof paper liners under the head to protect the tobacco from moisture. The tightness of the heads and the uniformity of the heads facilitate stenciling or marking, transportation, storage, handling and use.

It will be obvious to those skilled in the art that various changes may be made in the invention without departing from the spirit and scope thereof and therefore the invention is not limited by that which is illustrated in the drawings and described in the specification, but only as indicated in the accompanying claim.

I claim:

The method of making a hogshead head, comprising placing a plurality of elongated board members of substantially equal width and with interengaging tongue and groove edge portions designed to restrain buckling onto a flat surface, applying compressive force to the free edges of the external members in order transversally of the tongues and grooves to compress all the members together to form a panel, fastening a crosspiece of a length to extend entirely across the width of the panel and centrally thereof while the compressive force is applied, and sawing the panel into the desired circular configuration with the cross piece in diametrical position of the panel.

References Cited in the file of this patent

UNITED STATES PATENTS

| | | |
|---|---|---|
| 1,704,787 | Clarkson et al. | Mar. 12, 1929 |
| 2,147,952 | Raymond et al. | Feb. 21, 1939 |

FOREIGN PATENTS

| | | |
|---|---|---|
| 326,309 | France | Feb. 18, 1903 |
| 439,847 | France | Apr. 19, 1912 |
| 384,479 | Great Britain | Dec. 8, 1932 |